US008856386B2

(12) United States Patent
Dutta et al.

(10) Patent No.: US 8,856,386 B2
(45) Date of Patent: Oct. 7, 2014

(54) CLOUD RESOURCE PLACEMENT USING PLACEMENT PIVOT IN PHYSICAL TOPOLOGY

(75) Inventors: Debojyoti Dutta, Santa Clara, CA (US);
Senhua Huang, San Jose, CA (US);
Raja Tadimeti, Milpitas, CA (US);
Subrata Banerjee, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 13/591,107

(22) Filed: Aug. 21, 2012

(65) Prior Publication Data
US 2014/0059178 A1 Feb. 27, 2014

(51) Int. Cl.
*G06F 15/16* (2006.01)

(52) U.S. Cl.
USPC ............................ 709/248; 709/226; 370/225

(58) Field of Classification Search
USPC .......................................................... 709/245
See application file for complete search history.

(56) References Cited

U.S. PATENT DOCUMENTS

| 7,426,570 | B2* | 9/2008 | Andrzejak et al. ............ 709/235 |
| 7,441,033 | B2* | 10/2008 | Chidambaran et al. ....... 709/226 |
| 8,411,591 | B2* | 4/2013 | Bemont ........................ 370/255 |
| 2008/0183544 | A1* | 7/2008 | Matsumitsu et al. ............. 705/8 |
| 2012/0005342 | A1* | 1/2012 | Deng et al. .................... 709/225 |
| 2012/0303670 | A1* | 11/2012 | Gillen et al. ................... 707/797 |
| 2013/0002723 | A1* | 1/2013 | Poston et al. .................. 345/666 |
| 2013/0018999 | A1 | 1/2013 | Merrill et al. |
| 2013/0030859 | A1* | 1/2013 | Jung et al. ..................... 705/7.26 |
| 2013/0055091 | A1* | 2/2013 | Dutta et al. .................... 715/736 |
| 2013/0111033 | A1* | 5/2013 | Mao et al. ...................... 709/226 |
| 2013/0111068 | A1* | 5/2013 | Tyukasz et al. ............... 709/248 |
| 2013/0166712 | A1* | 6/2013 | Chandramouli et al. ..... 709/223 |

OTHER PUBLICATIONS

Tangmunarunkit et al., "The Impact of Routing Policy on Internet Paths", [online], [retrieved on Nov. 30, 2011]. Retrieved from the Internet: <URL: http://citeseerx.ist.psu.edu/viewdoc/download; jsessionid=79E6FAE46DEC10799559F34DAD219FA5?doi=10.1.1.105.4336&rep=rep1&type=pdf>, 7 pages.

Cisco, "Cisco Cloud Computing—Data Center Strategy, Architecture, and Solutions", Point of View White Paper for U.S. Public Sector 1st Edition, Aug. 2009, [online], [retrieved on Feb. 16, 2012]. Retrieved from the Internet: <URL: http://www.cisco.com/web/strategy/docs/gov/CiscoCloudComputing_WP.pdf>, pp. 1-16.

(Continued)

*Primary Examiner* — Hamza Algibhah
(74) *Attorney, Agent, or Firm* — Leon R. Turkevich (57) ABSTRACT

In one embodiment, a method comprises retrieving a request graph specifying request nodes identifying respective requested cloud computing service operations, and at least one request edge specifying a requested path requirements connecting the request nodes; identifying a placement pivot among feasible cloud elements identified in a physical graph representing a data network having a physical topology, each feasible cloud element an available solution for one of the request nodes, the placement pivot having a maximum depth in the physical topology relative to the feasible cloud elements; ordering the feasible cloud elements, according to increasing distance from the placement pivot to form an ordered list of candidate sets of feasible cloud elements; and determining an optimum candidate set, from at least a portion of the ordered list, based on the optimum candidate set having an optimized fitness function in the physical graph among the other candidate sets in the ordered list.

20 Claims, 10 Drawing Sheets

(56) References Cited

OTHER PUBLICATIONS

Geleji et al., "QoS Routing Across Multiple Autonomous Systems Using the Path Computation Element Architecture", [online], Mar. 2, 2010, [retrieved on Feb. 14, 2012]. Retrieved from the Internet: <URL: http://www4.ncsu.edu/~hp//Geza2.pdf>, pp. 1-18.

Kim et al., "Automated and Scalable QoS Control for Network Convergence", [online], [retrieved on Feb. 15, 2012]. Retrieved from the Internet: <URL: http://static.usenix.org/event/inm10/tech/full_papers/Kim.pdf>, 6 pages.

Sun, "QoS/Policy/Constraint Based Routing", [online], [retrieved on Nov. 30, 2011]. Retrieved from the Internet: <URL: http://www1.cse.wustl.edu/~jain/cis788-99/qos_routing/index.html>, pp. 1-2.

Guo et al., "SecondNet: A Data Center Network Virtualization Architecture with Bandwidth Guarantees", [online], [retrieved on Feb. 15, 2012]. Retrieved from the Internet: <URL: http://pages.cs.wisc.edu/~wenfeiwu/secondnet.pdf>, pp. 1-14.

Unified Data Center Products—Cisco Systems, "Data Center and Virtualization" [online], [retrieved on Feb. 16, 2012]. Retrieved from the Internet: <URL: http://www.cisco.com/en/US/netsol/ns340/ns394/ns244/products.html>, 5 pages.

\* cited by examiner

Define Physical Graph for IaaS by Multitenant Service Provider (SP):

(1) Identify Available Network Devices within Physical Topology and Collect Capabilities of Available Network Devices (e.g., Collect Capabilities Advertised by Network Devices), Including Device Type, vDC Service Type (e.g., Compute, Storage, Networking, etc.), Network Service Type (e.g., Provider Edge, Data Service Node, Firewall, etc.);

(2) Fetch Service Provider Constraints and Policies (e.g., Overlay Constraints, Bandwidth Constraints, Service Policies, etc.) — 90

Retrieve Customer Request Graph ($CG_{vDC}$) (for Cloud Computing Service) Specifying Customer Request Nodes (RN) and Request Edge(s) (REs) — 92

(Optional: Add Service Provider-Based Request Node(s) and Edges (SP) Representing Policies Implemented in Physical Graph by Cloud Service Provider, $G_{vDC} = CG_{vDC} + SP$) — 94

Identify Potential Request Node Placement in Physical Graph (i.e., Feasible Cloud Elements) Using Constrained Parsing and Filtering for Each Request Node Attribute Type, e.g.:
--Processor Type (Intel, ARM, AMD, etc.),
--vDC Service Type (e.g., Compute, Storage, Networking, etc.)
--Network Service Type (Provider Edge, Data Service Node, Firewall, etc.) — 96

Identify Possible Request Edge (Virtual Node) Placement: Build Sets of Possible Solutions for Feasible Cloud Elements (CEs) — 98

Candidate Sets of Feasible CEs: Filter Sets of Possible Solutions for Feasible CEs by SP Policies (e.g., Bandwidth Constraint Policies, Overlay Constraint Policies) — 100

| Node ID | Network Svc. Type | vDC Svc. Type | Processor Type | Available Bandwidth |
|---------|-------------------|---------------|----------------|---------------------|
| AGG1 | Aggregation | - | X | 8Gbps |
| FW1 | Firewall | - | X | 8Gbps |
| LB1 | Load Balancer | - | X | 10Gbps |
| ... | ... | ... | ... | ... |
| C1 | - | Web | Intel | 10Mbps |
| C4 | - | Web | ARM | 90Mbps |
| C8 | - | Web | AMD | 50Mbps |
| ... | ... | ... | ... | ... |
| C10 | - | App | Intel | 5Gbps |
| C13 | - | DB | ARM | 15Gbps |
| ... | ... | ... | ... | ... |

| "AGG" (Aggregation) | "Web" (Web Services) | "App" (Application Svcs.) | "DB" (Database Svcs.) |
|---------------------|----------------------|---------------------------|-----------------------|
| AGG1 | C1 | C10 | C13 |
| AGG1 | C1 | C10 | C21 |
| ... | ... | ... | ... |
| AGG1 | C1 | C12 | C16 |
| ... | ... | ... | ... |
| AGG2 | C9 | C21 | C16 |
| AGG2 | C19 | C21 | C30 |
| AGG2 | C19 | C21 | C31 |
| AGG2 | C19 | C21 | C32 |
| ... | ... | ... | ... |

| Node ID | Type | Distance (Hops) | Available BW |
|---|---|---|---|
| C21 | App | 2 | 6Gbps |
| C22 | App | 2 | 1Gbps |
| C23 | App | 2 | 1.5Gbps |
| C24 | App | 2 | 2Gbps |
| C10 | App | 6 | 8Gbps |
| C11 | App | 6 | 10Gbps |
| C12 | App | 6 | 4Gbps |
| C25 | DB | 4 | 2Gbps |
| ... | ... | ... | ... |
| C30 | DB | 4 | 8Gbps |
| C31 | DB | 4 | 3Gbps |
| C32 | DB | 4 | 2Gbps |
| C13 | DB | 6 | 6Gbps |
| C14 | DB | 6 | 5Gbps |
| C15 | DB | 6 | 2Gbps |
| C16 | DB | 6 | 3Gbps |

Figure 10

| FW2, LB2, AGG2, ACS3, C19, C21, C25 | Weakest Link BW | Aggregate Round-Trip BW |
|---|---|---|
| ... C19, C21, C25 | 2Gbps | 12Gbps |
| ... C19, C22, C25 | 1Gbps | 12Gbps |
| ... C19, C23, C25 | 1.5Gbps | 12Gbps |
| ... | ... | ... |
| ... C19, C21, C30 | 6Gbps | 12Gbps |
| ... C19, C22, C30 | 1Gbps | 12Gbps |
| ... | ... | ... |

Figure 11

CLOUD RESOURCE PLACEMENT USING PLACEMENT PIVOT IN PHYSICAL TOPOLOGY

TECHNICAL FIELD

The present disclosure generally relates to allocating data center resources in a multitenant service provider (SP) data network for implementation of a virtual data center (vDC) providing cloud computing services for a customer.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Placement of data center resources (e.g., compute, network, or storage) can be implemented in a variety of ways to enable a service provider to deploy distinct virtual data centers (vDC) for respective customers (i.e., tenants) as part of an Infrastructure as a Service (IaaS). The placement of data center resources in a multitenant environment, however, can become particularly difficult if a logically defined cloud computing service is arbitrarily implemented within the physical topology of the data center controlled by the service provider, especially if certain path constraints have been implemented within the physical topology by the service provider.

BRIEF DESCRIPTION OF THE DRAWINGS

Reference is made to the attached drawings, wherein elements having the same reference numeral designations represent like elements throughout and wherein:

FIGS. 6A-6B illustrate in further detail the method of FIG. 5, according to an example embodiment.

DESCRIPTION OF EXAMPLE EMBODIMENTS

Overview

In one embodiment, a method comprises retrieving, for a cloud computing service, a request graph specifying request nodes identifying respective requested cloud computing service operations, and at least one request edge specifying a requested path requirements connecting the request nodes; identifying a placement pivot from among feasible cloud elements identified in a physical graph representing a data network having a physical topology, each feasible cloud element an available solution for one of the request nodes, the placement pivot having a maximum depth in the physical topology relative to the feasible cloud elements; ordering the feasible cloud elements, within candidate sets of feasible cloud elements identified as available solutions for the at least one request edge, according to increasing distance from the placement pivot to form an ordered list of candidate sets of feasible cloud elements; and determining an optimum candidate set, from at least a portion of the ordered list, based on the optimum candidate set having an optimized fitness function in the physical graph from among the other candidate sets in the ordered list.

In another embodiment, an apparatus comprises a memory circuit and a processor circuit. The memory circuit is configured for storing a request graph for a cloud computing service, the request graph specifying request nodes identifying respective requested cloud computing service operations, and at least one request edge specifying a requested path requirements connecting the request nodes. The processor circuit is configured for: identifying a placement pivot from among feasible cloud elements identified in a physical graph representing a data network having a physical topology, each feasible cloud element an available solution for one of the request nodes, the placement pivot having a maximum depth in the physical topology relative to the feasible cloud elements; ordering the feasible cloud elements, within candidate sets of feasible cloud elements identified as available solutions for the at least one request edge, according to increasing distance from the placement pivot to form an ordered list of candidate sets of feasible cloud elements; and determining an optimum candidate set, from at least a portion of the ordered list, based on the optimum candidate set having an optimized fitness function in the physical graph from among the other candidate sets in the ordered list.

In another embodiment, logic encoded in one or more non-transitory tangible media for execution, and when executed operable for: retrieving, for a cloud computing service, a request graph specifying request nodes identifying respective requested cloud computing service operations, and at least one request edge specifying a requested path requirements connecting the request nodes; identifying a placement pivot from among feasible cloud elements identified in a physical graph representing a data network having a physical topology, each feasible cloud element an available solution for one of the request nodes, the placement pivot having a maximum depth in the physical topology relative to the feasible cloud elements; ordering the feasible cloud elements, within candidate sets of feasible cloud elements identified as available solutions for the at least one request edge, according to increasing distance from the placement pivot to form an ordered list of candidate sets of feasible cloud elements; and determining an optimum candidate set, from at least a portion of the ordered list, based on the optimum candidate set having an optimized fitness function in the physical graph from among the other candidate sets in the ordered list.

Detailed Description

Particular embodiments enable optimized placement of a request graph within a physical topology of a service provider data network. The request graph provides a logical representation (or logical definition) of a virtual data center to be implemented within the service provider data network for a tenant in a multitenant environment. The request graph specifies request nodes, and at least one request edge specifying a requested path requirements connecting the request nodes. Each request node of the request graph provides a logical identification (or definition) of a corresponding cloud computing service operation in the virtual data center, where the cloud computing service operation can be a compute, storage, or networking service, or can implement a service provider-based policy or constraint. Each request edge specifies a corresponding requested path requirements connecting two request nodes, and can specify path requirements based on required bandwidth or quality of service, connection type, etc. Each requested path may require one or more hops between network devices in the physical topology.

The particular embodiments optimize the placement of the request graph within the physical topology based on identifying feasible cloud elements within a physical graph representing the service provider data network having the physical topology. The feasible cloud elements from the physical graph satisfy specified constraints of the request nodes. A fitness function describes the available resources in the physical graph, such that placement of the request graph within the physical topology results in a reduction or decrease in the fitness function due to the corresponding consumption of physical resources within the physical graph by the newly-placed virtual graph.

A placement pivot is identified among the feasible cloud elements: the placement pivot is chosen as providing the greatest influence in affecting existing resources within the data network, in other words the placement pivot provides the greatest influence in affecting the fitness function describing the available resources in the physical graph; in one example, the placement pivot can have a maximum depth in the physical topology relative to the feasible cloud elements. The placement pivot is used to order the resources of the data network based on proximity to the placement pivot, for example the feasible cloud elements can be ordered according to increasing distance from the placement pivot to form an ordered list of candidate sets of feasible cloud elements. Any of the feasible cloud elements or candidate sets of feasible cloud elements can be filtered to remove those that do not satisfy any service provider policies (e.g., bandwidth constraint policies, overlay constraint policies, prescribed path constraint policies). At least a portion (K) of the remaining candidate sets of feasible cloud elements in the ordered list can be evaluated relative to a fitness function describing the available resources in the physical graph, in order to heuristically determine the optimum candidate set having an optimized fitness function among the other candidate sets in the ordered list. The heuristic determination of the optimum candidate set having the optimized fitness function results in a sequence of physical network nodes implementing the request graph in the physical topology in a manner that optimizes the placement of the request graph within the physical graph, for example minimizing consumption of bandwidth in the physical topology, minimizing fragmentation of data streams in the virtual data center, etc.

Hence, the virtual data center requirements that are logically defined by a tenant (and/or constrained by service provider policies) can be optimally implemented within the service provider data center based on heuristic optimization of the fitness function relative to an ordered list of candidate sets of feasible cloud elements from a placement pivot providing the greatest influence to the heuristic optimization. Moreover, the placement of the request graph based on heuristic optimization of data center resources maintains compliance with any prescribed path constraints that may be specified in advance by the service provider.

Figure 1:
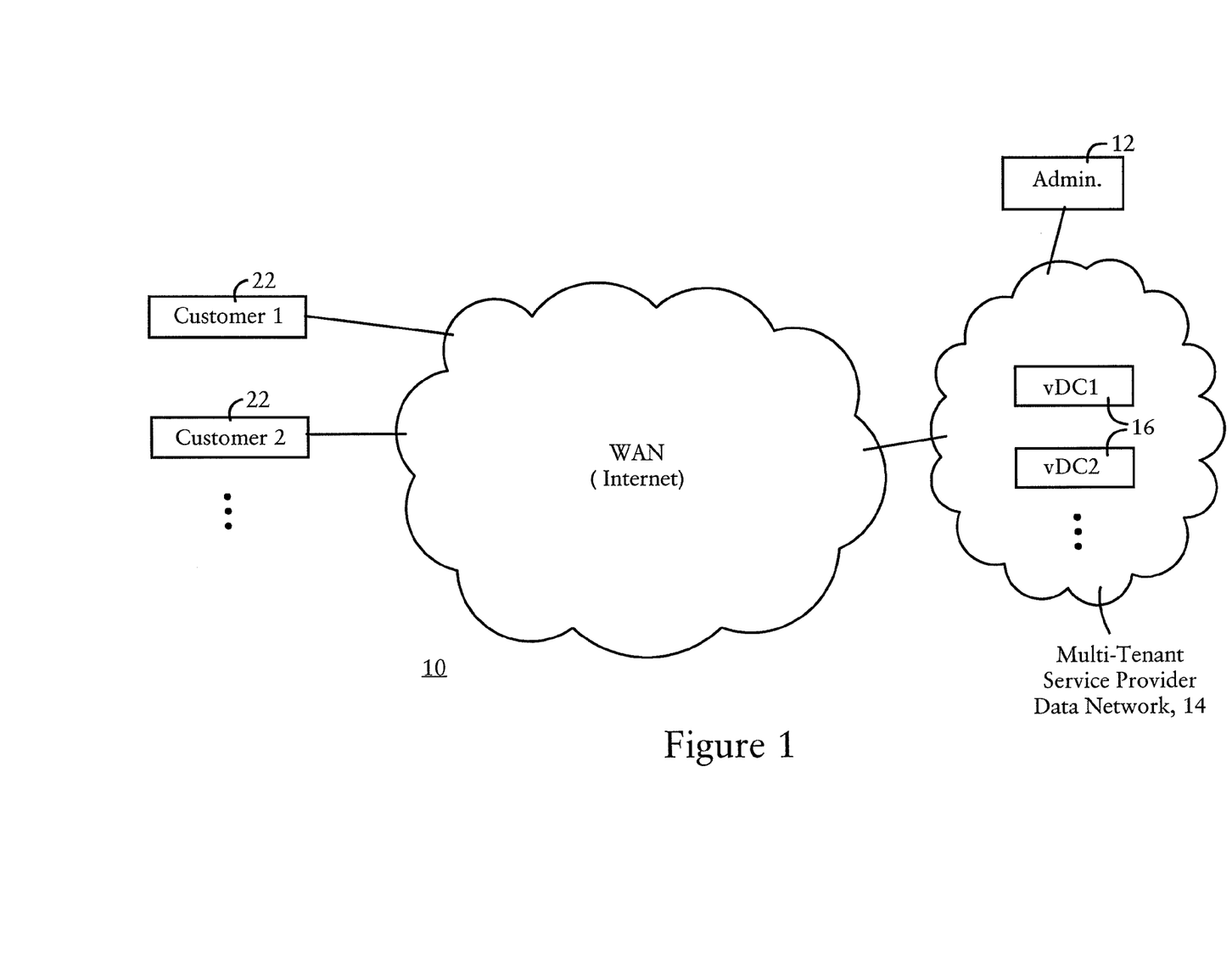
FIG. 1 illustrates an example system having an apparatus determining an optimum placement, within the physical topology of a service provider data network, of a request graph defining cloud computing service operations for a customer, according to an example embodiment.

FIG. 1 is a diagram illustrating an example system 10 having an apparatus 12 for determining an optimum placement within a service provider data network 14 of a request graph defining cloud computing service operations for a virtual data center 16, according to an example embodiment. The apparatus 12 is a physical machine (i.e., a hardware device) configured for implementing network communications with other physical machines via the service provider data network 10 and/or a wide area network (WAN) (e.g., the Internet) 18. Hence, the apparatus 12 is a network-enabled user machine providing user access to a network and implementing network communications via the network 10.

The apparatus 12 is configured for implementing virtual data centers 16 for respective customers (i.e., tenants) in a multitenant environment, where virtual data centers 16 can be implemented within the service provider data network 14 using shared physical resources, while logically segregating the operations of the virtual data centers 16 to ensure security, etc. Each virtual data center 16 added to the service provider data network 14 consumes additional physical resources; moreover, logical requirements for a virtual data center 16 (either by the customer 22 or by service-provider policies) need to be reconciled with physical constraints within the service provider data network (e.g., bandwidth availability, topologically-specific constraints, hardware compatibility, etc.). Moreover, arbitrary allocation of physical resources in the service provider data network 14 for a virtual data center 16 may result in inefficient or unreliable utilization of resources.

According to an example embodiment, heuristic optimization of data center resources relative to a placement pivot (providing the greatest influence to the heuristic optimization) enables the efficient placement within the data center of the request graph that logically defines virtual data center 16, will preserving service provider policies and constraints.

Figure 2:
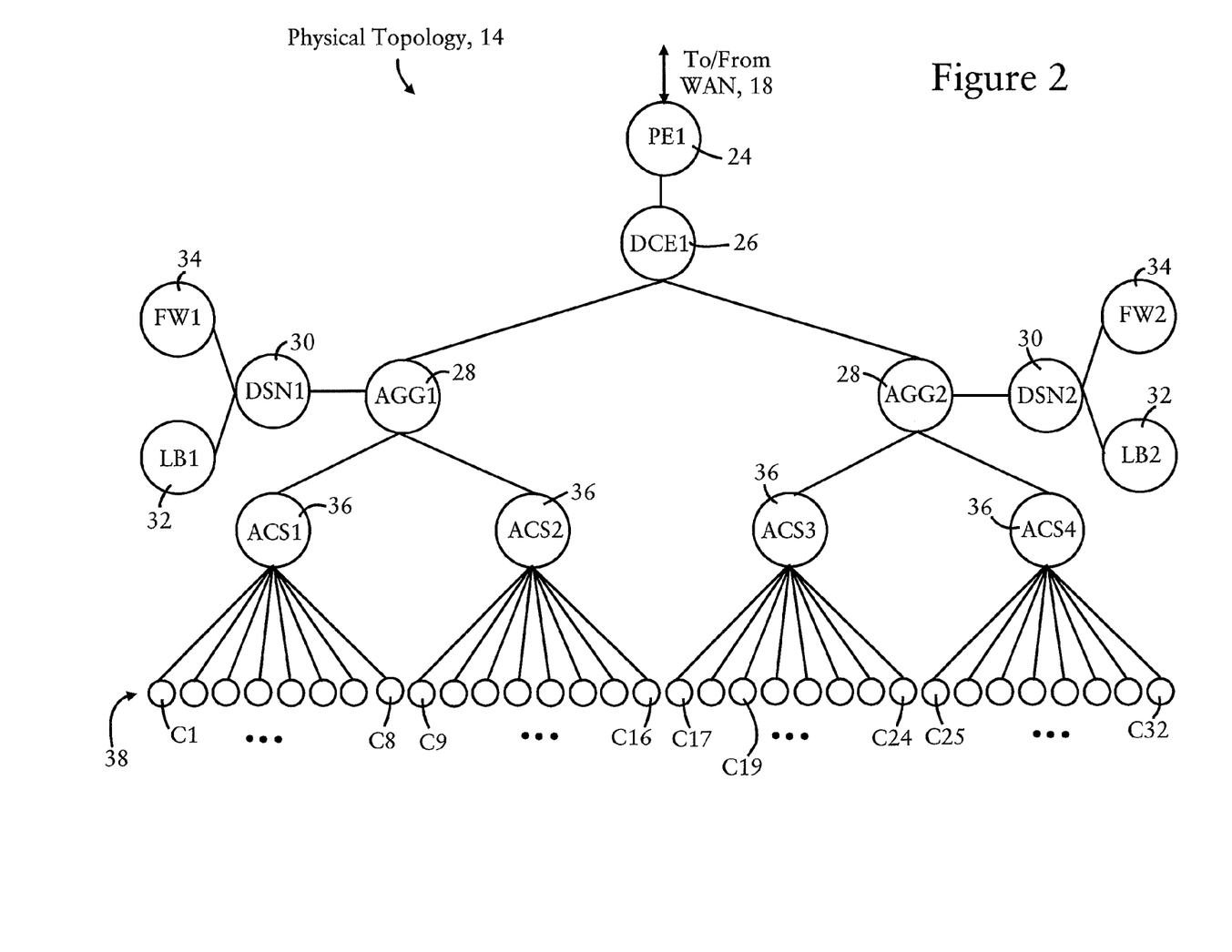
FIG. 2 illustrates an example physical topology of the service provider data network of FIG. 1.

FIG. 2 illustrates an example physical topology of the service provider data network 14 of FIG. 1, according to an example embodiment. The physical topology 14 defines the link layer (layer 2) and network layer (layer 3) connectivity between physical network devices within the service provider data network. The physical topology 14, as well as service provider policies, path constraints, and inventory of available versus allocated resources are maintained by the apparatus 12 in the form of a physical graph 20 stored in a memory circuit 48 (illustrated in FIG. 3) that represents the data network 14.

Hence, the physical graph 20 defines and represents all attributes of the data network 14.

As illustrated in FIG. 2, the physical topology 14 can include at least one provider edge router "PEA" 24, at least one data center edge router "DCE1" 26, aggregation switches (e.g., "AGG1", "AGG2") 28, data service nodes (e.g., "DSN1", "DSN2") 30, load balancer devices (e.g., "LB1", "LB2") 32, firewall nodes (physical devices or virtualized) (e.g., "FW1", "FW2") 34, access switches (e.g., "ACS1" to "ACS4") 36, and compute elements (e.g., "C1" to "C32") 38. The devices illustrated in the physical topology can be implemented using commercially available devices, for example the access switches 36 can be implemented using the commercially available Cisco Nexus 7000 or 5000 Series Access Switch from Cisco Systems, San Jose, Calif.; various physical devices can be used to implement the compute elements 38, depending on the chosen virtual data center service or cloud computing service operation to be provided (e.g., compute, storage, or network service). An example compute element 38 providing compute services could be a unified computing system (e.g., the Cisco UCS B-Series Blade Servers) commercially available from Cisco Systems.

Figure 8:
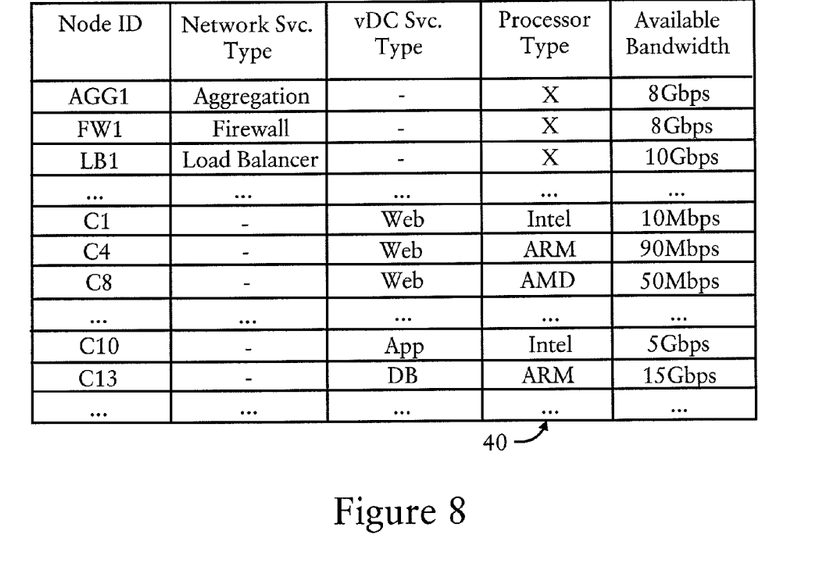
FIG. 8 illustrates an example inventory and attributes of network devices in the physical topology of FIG. 2, for use by the apparatus of FIG. 3 in identifying feasible cloud elements as available solutions for the request nodes of FIG. 7.

Although not illustrated in FIG. 2, the physical graph 20 representing the data network 14 also includes an identification of attributes 40 (FIG. 8) of each of the network devices in the data network 14, including not only hardware configurations (e.g., processor type), but also identification of the assigned service type to be performed (e.g., network service type of aggregation, firewall, load balancer, etc.; virtual data center service type of web server ("Web"), back-end application server ("App"), or back end database server ("DB")), available resources that have not yet been assigned to a virtual data center 16 (e.g., bandwidth, memory, CPU capacity, etc.). Other attributes that can be specified within the attributes 40 include particular capabilities of a network device, for example whether a network switch is "layer 3 aware" for performing layer 3 (e.g., Internet protocol) operations. Hence, the physical graph 20 includes an example inventory 40 and attributes of the network devices in the physical topology 14, for use by the apparatus 12 in identifying feasible cloud elements based on performing constrained parsing and filtering of the network devices relative to logical constraints specified by a request graph or service provider-based constraints and policies, described below.

Figure 3:
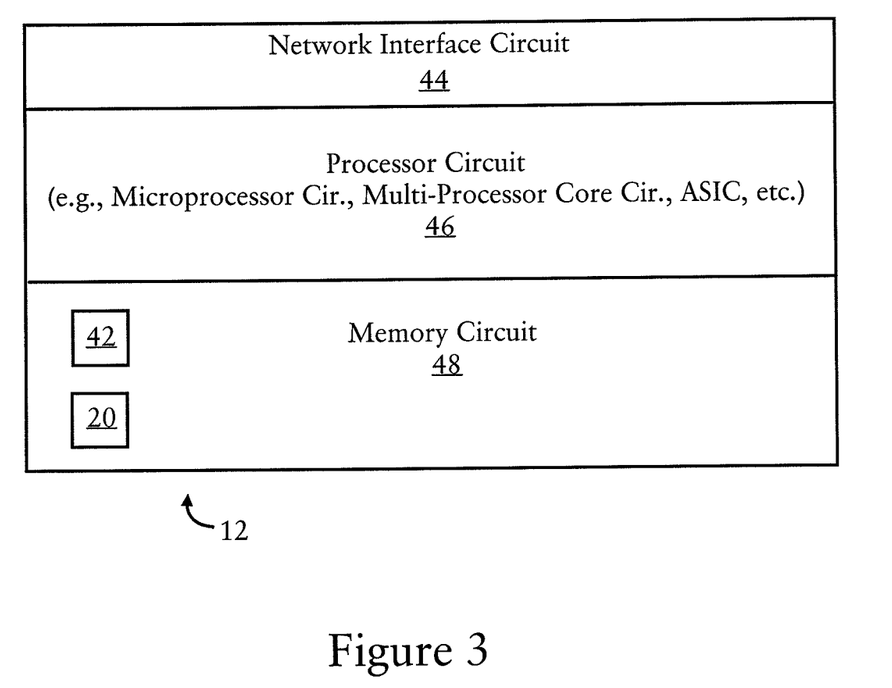
FIG. 3 illustrates the example apparatus of FIG. 1 configured for determining the optimum placement of the request graph within the physical topology of the service provider data network, according to an example embodiment.

FIG. 3 illustrates the example apparatus 12 configured for determining the optimum placement of the request graph 42 (FIG. 4) within the physical topology 14 based on the attributes 40 and service provider-based constraints and policies stored in the physical graph 20, according to an example embodiment. The apparatus 12 that determines the optimum placement of the request graph 42 can be implemented as a single physical machine (i.e., a hardware device) configured for implementing network communications with other physical machines via the network 14 and/or 18. Alternately, the apparatus 12 can be implemented as multiple physical machines configured for implementing distributed computing based on coordinated communications between physical machines in the network 14 and/or 18.

The apparatus 12 can include a network interface circuit 44, a processor circuit 46, and a non-transitory memory circuit 48. The network interface circuit 44 can be configured for receiving, from any requestor 22, a request for a service such as a request graph 42 from a customer 22. The network interface circuit 44 also can be configured for sending requests initiated by the processor circuit 46 to targeted network devices of the service provider data network 14, for example XMPP requests for configuration and/or policy information from the management agents executed in any one of the network devices of the service provider data network; the network interface 44 also can be configured for receiving the configuration and/or policy information from the targeted network devices. The network interface 44 also can be configured for communicating with the customers 22 via the wide-area network 18, for example an acknowledgment that the request graph 42 has been deployed and activated for the customer 22. Other protocols can be utilized by the processor circuit 46 and the network interface circuit 44, for example IGP bindings according to OSPF, IS-IS, and/or RIP protocol; logical topology parameters, for example BGP bindings according to BGP protocol; MPLS label information according to Label Distribution Protocol (LDP); VPLS information according to VPLS protocol, and/or AToM information according to AToM protocol (the AToM system is a commercially-available product from Cisco Systems, San Jose, Calif., that can transport link layer packets over an IP/MPLS backbone).

The processor circuit 46 can be configured for executing a Cisco Nexus platform for placement of the request graph 42 into the physical topology 14, described in further detail below. The processor circuit 46 also can be configured for creating, storing, and retrieving from the memory circuit 48 relevant data structures, for example the physical graph 20, etc. The memory circuit 48 can be configured for storing any parameters used by the processor circuit 46, described in further detail below.

Any of the disclosed circuits (including the network interface circuit 44, the processor circuit 46, the memory circuit 48, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 48) causes the integrated circuit(s) implementing the processor circuit 46 to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 48 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 48 can be implemented dynamically by the processor circuit 46, for example based on memory address assignment and partitioning executed by the processor circuit 46.

Figure 4:
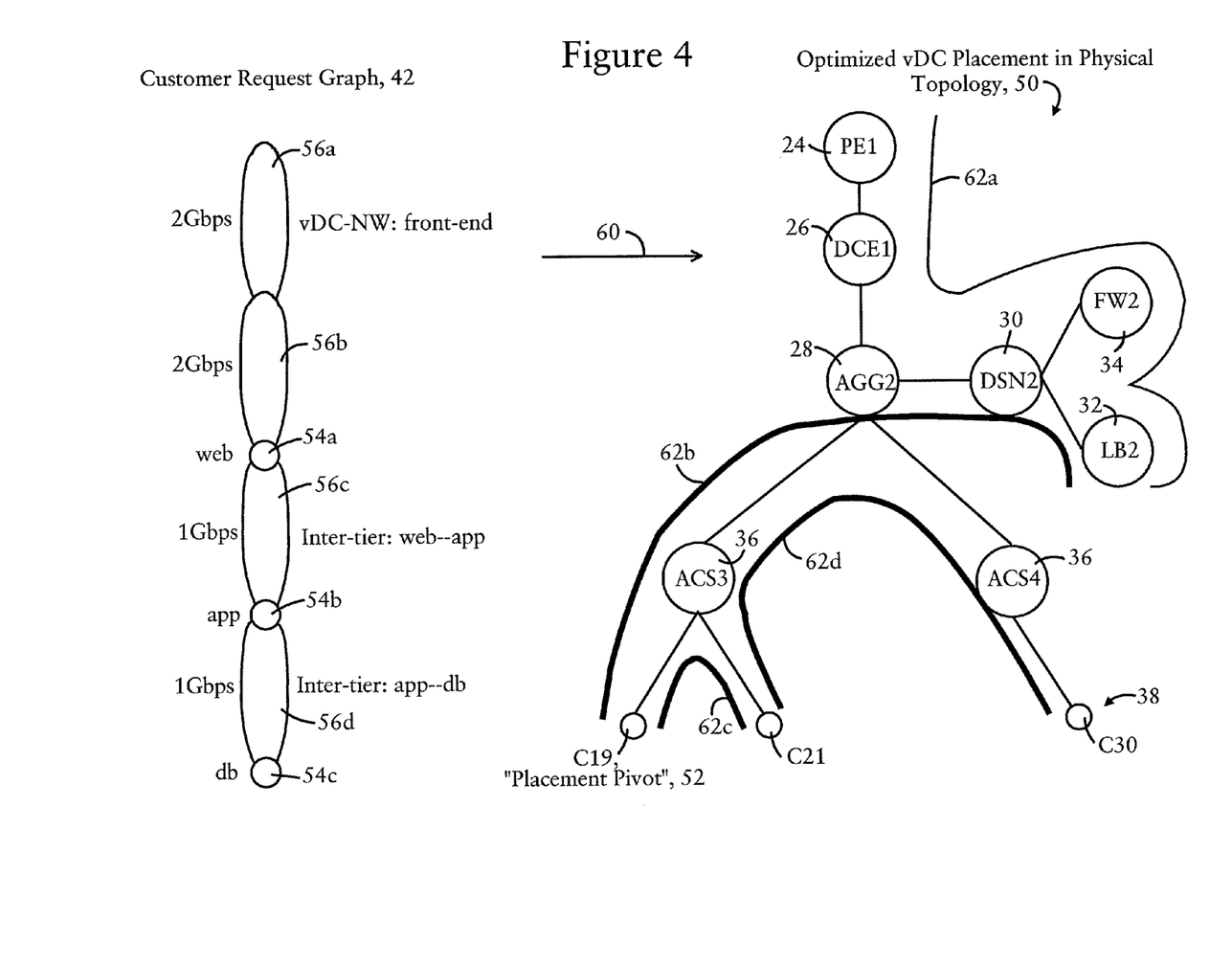
FIG. 4 illustrates an example optimal placement, by the apparatus of FIG. 3, of a request graph into a selected portion of the physical topology of the service provider data network based on identification of a placement pivot within the physical topology, according to an example embodiment.

FIG. 4 illustrates an example optimal placement 50 of a request graph 42 by the processor circuit 46 into a selected portion of the physical topology 14 of the service provider data network based on identification of a placement pivot 52 within the physical topology, according to an example embodiment.

The request graph 42 specifies request nodes 54 (e.g., 54a, 54b, and 54c) and at least one request edge 56 (e.g., 56a, 56b, 56c, and 56d). Each request node 54 identifies (or defines) at least one requested cloud computing service operation to be performed as part of the definition of the virtual data center 16 to be deployed for the customer. For example, the request node 54a specifies the cloud computing service operation of "web" for a virtualized web server; the request node 54b specifies the cloud computing service of "app" for virtualized back end application services associated with supporting the virtualized web server; the request node 54c specifies the cloud computing service of "db" for virtualized database application operations responsive to database requests from the virtualized back end services. Each request node 54 can be associated with one or more physical devices within the physical topology 14, where typically multiple physical devices may be used to implement the request node 54.

Each request edge 56 specifies a requested path requirements connecting two or more of the request nodes 54. For example, a first request edge ("vDC-NW: front-end) 56a specifies logical requirements for front-end applications for the virtual data center 16, including firewall policies and load-balancing policies, plus a guaranteed bandwidth requirement of two gigabits per second (2 Gbps); the request edge 56b specifies a requested path requirements connecting the front end to the request node 54a associated with providing virtualized web server services, including a guaranteed bandwidth requirement of 2 Gbps; the request edge 56c specifies a requested path providing inter-tier communications between the virtualized web server 54a and the virtualized back end application services 54b, with a guaranteed bandwidth of 1 Gbps; and the request edge 56d specifies a requested path providing inter-tier communications between the virtualized back and application services 54b and the virtualized database application operations 54c, with a guaranteed bandwidth of 1 Gbps. Hence, the request graph 42 provides a logical definition of the virtual data center 16 to be deployed for the customer 22.

Depending on implementation, the request edges 56 of the request graph 42 may specify the bandwidth constraints in terms of one-way guaranteed bandwidth, requiring the service provider to possibly double the bandwidth requirements between physical network nodes implementing the request nodes 54. Further, the physical topology 14 may include many different hardware configuration types, for example different processor types or switch types manufactured by different vendors, etc. Further, the bandwidth constraints in the physical topology 14 must be evaluated relative to the available bandwidth on each link, and the relative impact that placement of the request graph 42 across a given link will have with respect to bandwidth consumption or fragmentation. Further, service provider policies may limit the use of different network nodes within the physical topology: an example overlay constraint may limit network traffic for a given virtual data center 16 within a prescribed aggregation realm, such that any virtual data center 16 deployed within the aggregation realm serviced by the aggregation node "AGG1" 28 can not interact with any resource implemented within the aggregation realm service by the aggregation node "AGG2" 28; an example bandwidth constraint may require that any placement does not consume more than ten percent of the maximum link bandwidth, and/or twenty-five percent of the available link bandwidth.

In addition to the foregoing limitations imposed by the customer request graph and/or the service provider policies, arbitrary placement of the customer request graph 42 within the physical topology 14 may result in reversal of network traffic across an excessive number of nodes, requiring an additional consumption of bandwidth along each hop.

According to an example embodiment, the processor circuit 46 can determine in operation 60 of FIG. 4 an optimum candidate set of feasible cloud elements, resulting in the optimized placement 50 of the customer virtual data center 16 according to the request graph 42. The processor circuit 46 identifies a placement pivot 52 that provides the greatest influence in affecting existing resources within the data network 14: as described in further detail below, the processor circuit 46 identifies the compute node "C19" 38 as a feasible cloud element for the request node 54a; the processor circuit 46 also identifies compute node "C19" as having the greatest influence in affecting existing resources within the data network 14, for example based on having the maximum depth (e.g., five hops) within the physical topology 14. The processor circuit 46 also identifies the compute node "C21" as a feasible cloud element for the request node 54b, and the compute node "C30" as a feasible cloud element for the compute node 54c.

As described further detail below, the processor circuit 46 orders the feasible cloud elements according to increasing distance from the placement pivot 52 in order to form an ordered list of candidate sets of feasible cloud elements. The processor circuit 46 determines an optimized fitness function in the physical graph 20 from the ordered list, enabling the identification of the optimum candidate set including the sequence of feasible cloud elements that establish the network paths 62 for reaching the feasible cloud elements. As illustrated in FIG. 4, the identification of the optimum candidate set results in: the request edge 56a being deployed along the multi-hop network path 62a; the request edge 56b being deployed along the network path 62b; the request edge 56c being deployed along the network path 62c; and the request edge 56d being deployed along the network path 62d.

Figure 5:
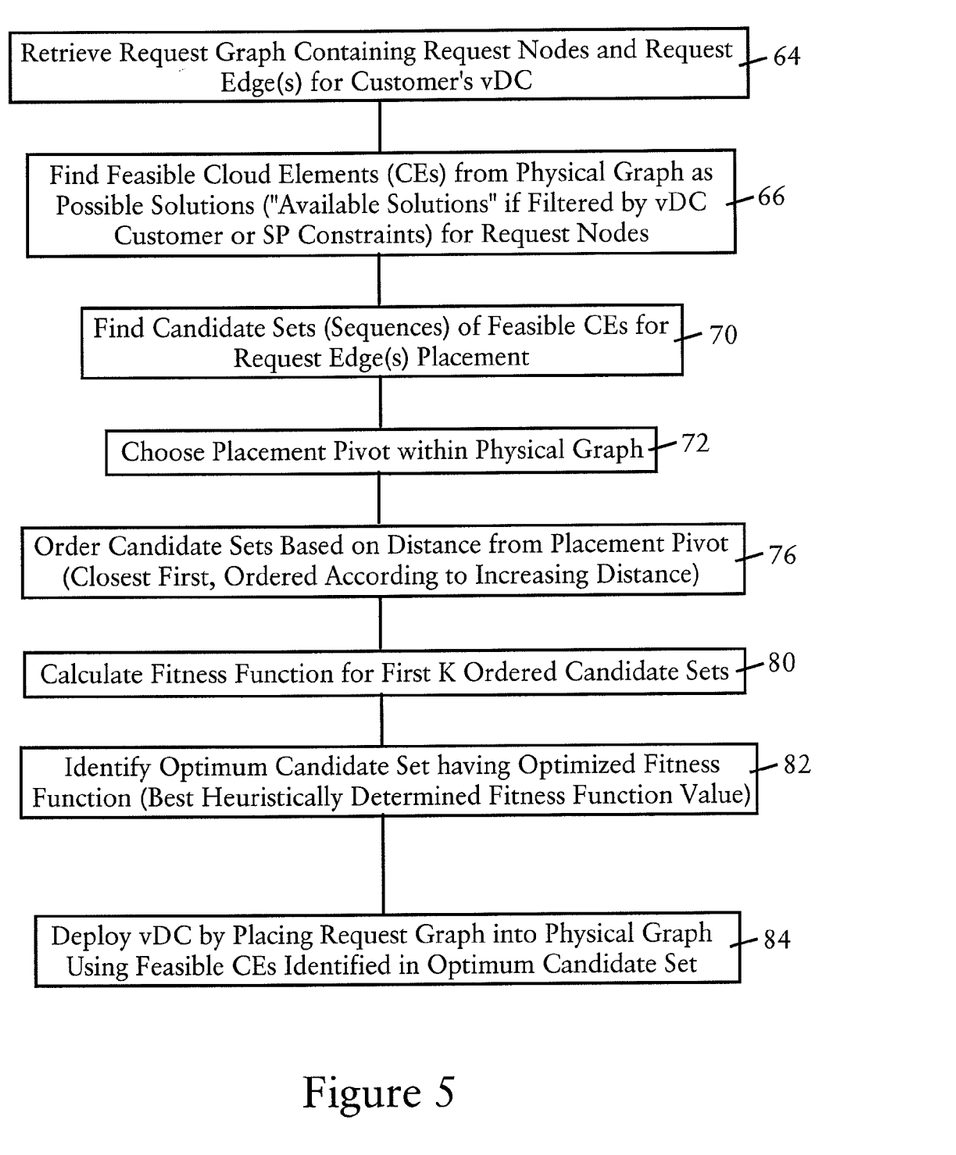
FIG. 5 illustrates an example method summarizing the optimal placement of the request graph into the physical topology based on identification of the placement pivot, according to an example embodiment.
Figure 6B:
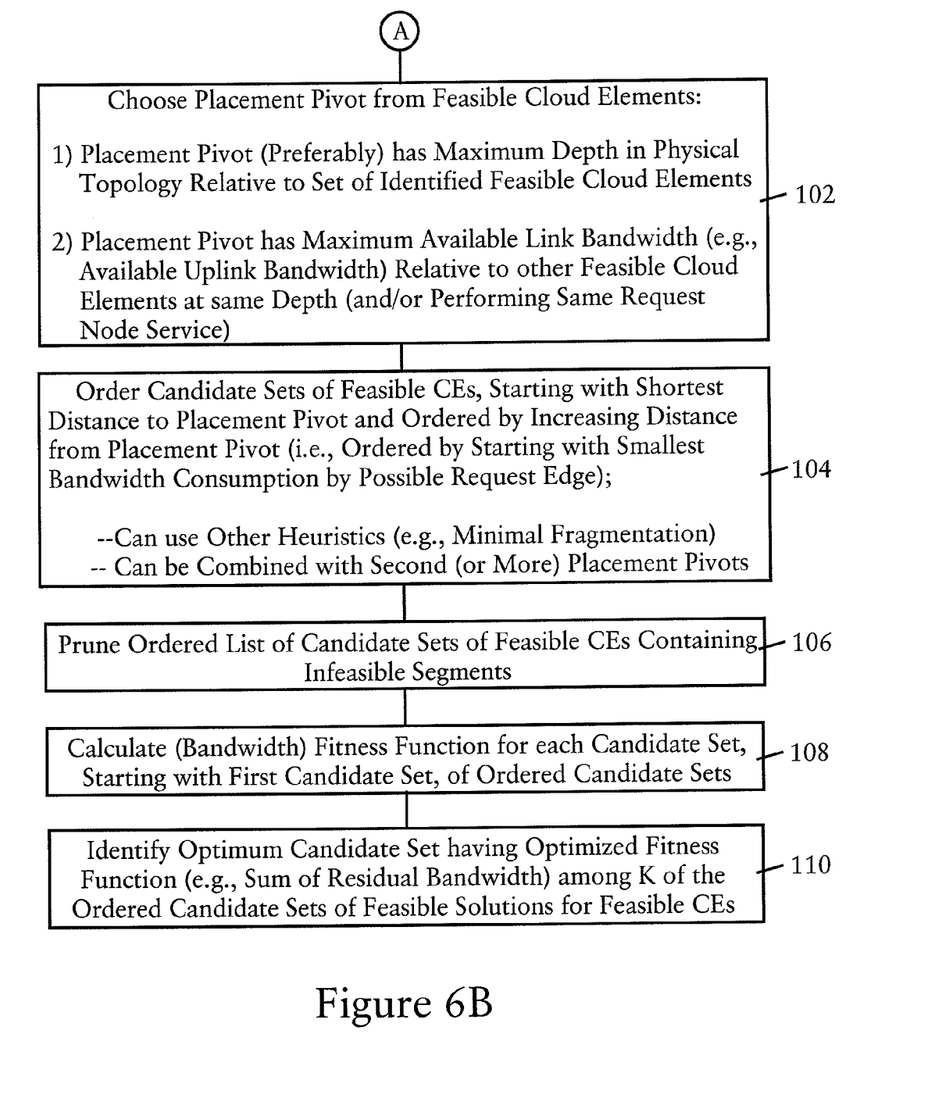

FIG. 5 illustrates an example method summarizing the optimal placement of the request graph into the physical topology based on identification of the placement pivot, according to an example embodiment. FIGS. 6A-6B illustrate in further detail the method of FIG. 5, according to an example embodiment. The operations described in FIGS. 5-6 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 5, the processor circuit 46 retrieves in operation 64 the request graph 42, for example from the memory circuit 48, from another data storage node in the service provider data network 14, or directly from the customer 22 via the wide-area network 18. The processor circuit 46 in operation 66 finds, from the physical graph 20, feasible cloud elements (CEs) that are identified as possible solutions 74 (FIG. 9) for the request nodes.

Figure 7:
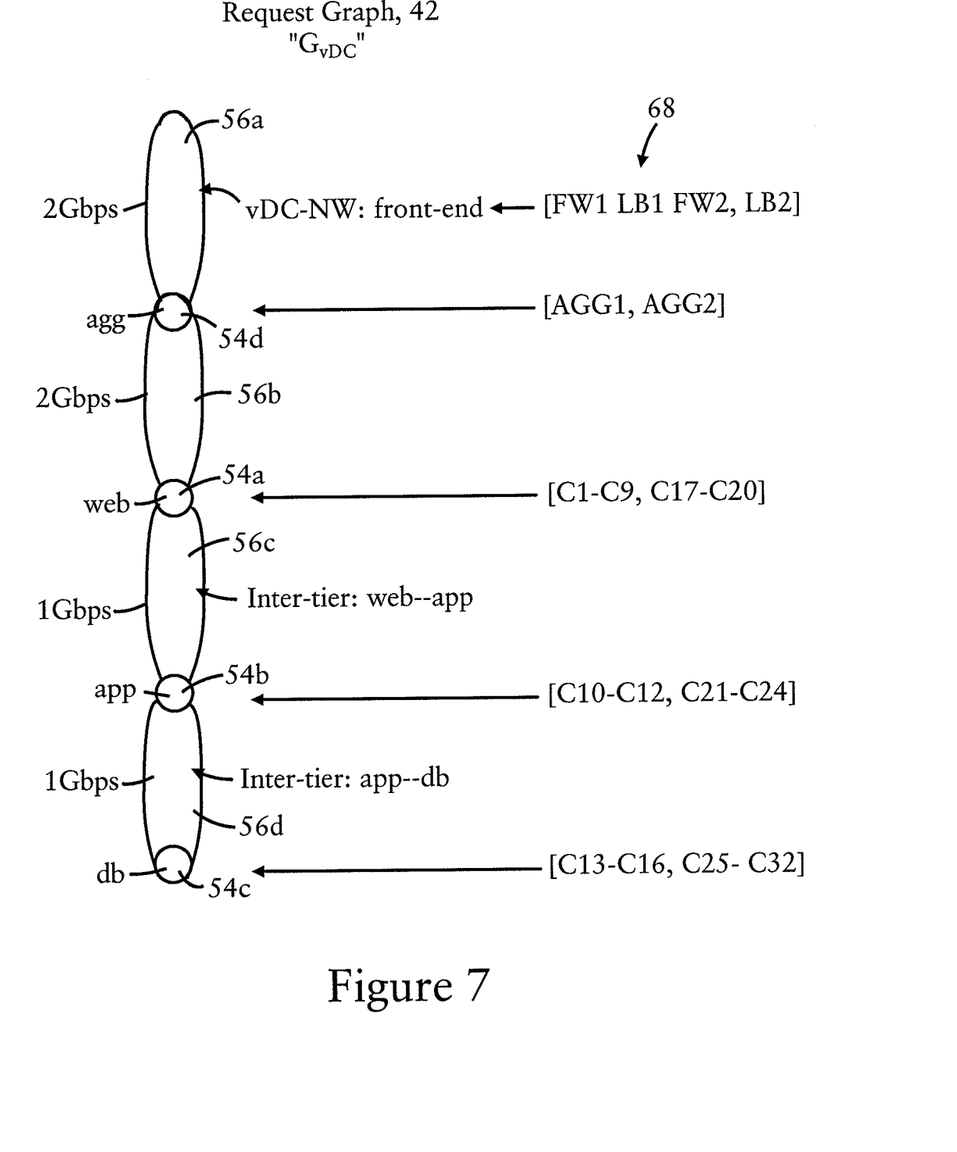
FIG. 7 illustrates example feasible cloud elements identified by the apparatus of FIG. 3 as available solutions for request nodes, according to an example embodiment.

As illustrated in FIG. 7, the processor circuit 46 in operation 66 can identify feasible cloud elements 68 (from the physical topology 14) that are determined to be a possible solution for a corresponding request node 54, based on the request node 54 specifying service requirements on at least one prescribed attribute type (e.g., processor type, virtual data center service type, network service type, etc.). For example, the processor circuit 46 can identify (e.g., from the list of attributes 48 in FIG. 8) that the computing nodes C1 through C9 and C17 through C20 of FIG. 2 each are configured to provide the virtualized Web server services requested by the request node 54a, the computing nodes C10 through C12 and C21 through C24 each are configured to provide the virtualized backend application services requested by the request node 54b, and the computing nodes C13 through C16 and C25 through C32 each are configured to provide the virtualized database application operations requested by the request node 54c. The processor circuit 46 also can identify that the network nodes "LB1" and "LB2" 32, and "FW1" and "FW2" 34, can provide at least some of the network services requested in the request edge 56a, and that the aggregation nodes "AGG1" and "AGG2" 28 can provide the network service type of aggregation service requested in the aggregation "agg" request node 54d, where the request node 54d can be added by the service provider based on prescribed policies and constraints imposed by the service provider.

The processor circuit 46 in operation 66 also can filter, from the possible solutions, those network nodes that do not satisfy any customer constraints or service provider constraints for the request nodes. For example, if a customer requests one provider edge router 24 while the service provider data network 14 includes multiple service provider edge routers 24 for connecting to the wide-area network 18, then if the customer specifies multiprotocol label switching (MPLS), the processor circuit 46 will filter out any provider edge router 24 that does not offer MPLS services (assume in this example that the provider edge router "PE1" offers MPLS services and another provider edge router (not shown) does not provide MPLS services). In addition, the customer may request that the compute nodes 38 utilizes Intel processor cores; hence, ARM or AMD processor cores would be removed, resulting in the feasible cloud elements 68 that serve as "available solutions" for the request nodes based on multiple request attributes.

The processor circuit in operation 70 attempts to locate candidate sets of feasible cloud elements, for example based on generating a sequence of feasible cloud elements 68 that are chosen from each of the sets of available solutions for the corresponding request node 54. In one example embodiment, permutations of sequences may be generated by the processor circuit 46; in another embodiment, operation 70 can be deferred until after the placement pivot 52 is chosen in operation 72.

The processor circuit in operation 72 can choose a placement pivot 52 within the physical graph 20, as illustrated in the physical topology 14 as the compute node "C19" 38. The placement pivot 52 is chosen by the processor circuit 46 as providing the greatest influence in affecting the fitness function, described below. After choosing a placement pivot 52, the processor circuit 46 in operation 76 can order the feasible cloud elements 68, within candidate sets of feasible cloud elements, according to increasing distance from the placement pivot 52 (i.e., the closest node first, ordered according to increasing distance). Hence, the ordering in operation 76 can form an ordered list 78 of candidate sets of feasible cloud elements, illustrated in FIG. 11. The ordered list 78 represents a list of potential solutions for the request graph 42, starting with a solution providing a minimal impact or influence in adversely affecting (i.e., degrading) the fitness function; for example, the list of potential solutions can start with solutions that potentially provide minimal reduction in the fitness value of the physical data center topology. Hence, the entire set of candidate sets in the ordered list 78 need not be parsed to exhaustively identify an optimal solution, since the first K members of the ordered list can provide the best results in providing minimal adverse impact (e.g., minimal reduction) to the fitness function of the physical graph 20 with a high probability, subject to filtering any infeasible candidates in the ordered list that cannot satisfy all required constraints by the request graph 42 or the service provider-based constraints and policies.

Figure 11:
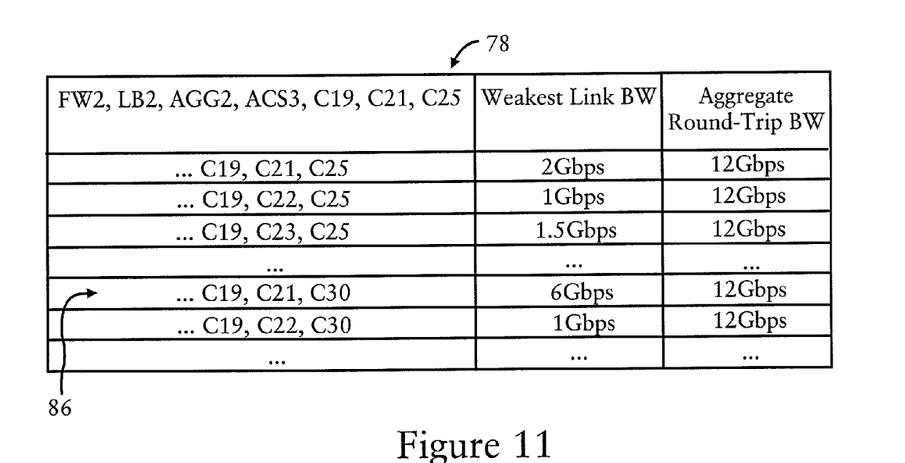
FIG. 11 illustrates an example ordered list of candidate sets of feasible cloud elements formed by the apparatus of FIG. 3, for determining an optimized candidate set having an optimized fitness function in the physical graph of FIG. 2, according to an example embodiment.

Hence, the processor circuit 46 in operation 80 can calculate the fitness function for the first K feasible candidate sets in the ordered list 78, in order to identify in operation 82 the optimum candidate set 86 having the optimized fitness function, i.e., the best heuristically determined fitness function value that provides the least reduction in the fitness function upon placement of the request graph 42 into the physical graph 20 during deployment in operation 84 using the feasible cloud elements identified in the optimum candidate set 86. As illustrated in FIG. 11, the optimum candidate set 86 includes the sequence of feasible cloud elements "C19" for the request node 54a, "C21" for the request node 54b, and "C30" for the request node 54c, resulting in the optimized placement 50 illustrated in FIG. 4.

FIGS. 6A and 6B illustrate in further detail the method by the processor circuit 46 of determining an optimum candidate set 86 for optimized placement 50 in the physical graph 20, according to an example embodiment. Prior to identifying feasible cloud elements, the processor circuit 46 first defines in operation 90 the physical graph 20 for providing infrastructure as a service (IaaS) by the multitenant service provider. The physical graph 20 is defined from the physical topology 14 based on the processor circuit 46 identifying the available network devices within the physical topology 14, and collecting from the network devices the relative capabilities: the capabilities can be collected according to various network management policies, for example XMPP, or prescribed application programming interfaces (APIs), etc. Other policy-based management schemes may be used, for example a policy agent, inventory agent, a provisioning agent, etc., enabling the processor circuit 46 to identify the relative capabilities of the network devices, and to identify the available bandwidth on network links. The processor circuit 46 also can fetch service provider constraints and policies, for example overly constraints that limit virtual data center traffic within a prescribed aggregation realm, bandwidth constraints that limit the amount of bandwidth that may be consumed on any given data link in the physical topology 14, and/or service policies that limit service or performance based on contractual agreements or schedules with the customer 22. Although the physical topology 14 is illustrated as a tree topology, the disclosed techniques could be applied to other physical topology that do not necessarily rely on a tree topology (e.g., fat-tree topology or mesh topology).

The processor circuit 46 retrieves in operation 92 the customer request graph (e.g., 42 of FIG. 4) that specifies the request nodes 54a, 54b, and 56c specified by the customer, and the request edges 54a, 56b, 56c, and 56d specified by the customer 22. The processor circuit 4674 can optionally add service provider-based request nodes (e.g., 54d of FIG. 7) and/or request edges 56 that represent policies implemented in the physical graph 20 by the cloud service provider for a cloud computing service, resulting in the request graph $G_{vDC}$ of FIG. 7.

The processor circuit 46 in operation 96 identifies potential request node placement based on identifying feasible cloud elements 68 using constrained parsing and filtering for each attribute type specified by a request node 54. For example, the request node 54 can request a processor type (e.g., an Intel-based processor core, an ARM-based processor core, and AMD-based processor core, etc.); the request node 54 also can specify a prescribed virtual data center service type, for example a compute service, storage service, or a networking service; the request node 54 also can specify a prescribed network service type, for example a provider edge service, a data service node, a firewall service, etc. Other attributes can be specified by a request node, for example media streaming, online collaboration, etc.

Hence, the request graph 42 illustrated in FIG. 7 precisely defines the virtual data center 16 to be implemented for the customer 22, including the policies and constraints imposed by the service provider within the data network 14.

Figure 9:
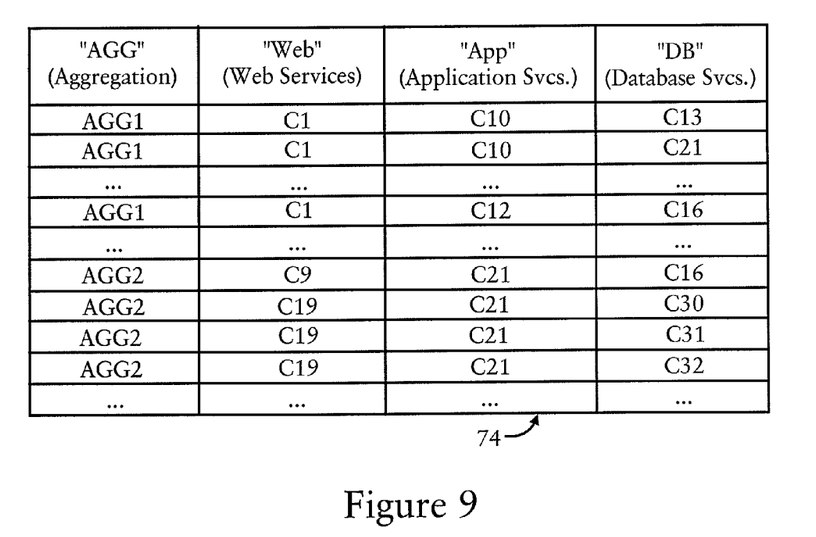
FIG. 9 illustrates example sets of possible solutions for feasible cloud elements identified by the apparatus of FIG. 3 as potential solutions for the request edges of FIG. 7.

The processor circuit 46 in operation 98 can identify possible request edge placement based on building sets 74 of possible solutions for feasible cloud elements 68. The sets 74 of possible solutions for feasible cloud elements 68 are identified based on identifying respective paths in the physical graph 20 for connecting the associated feasible cloud elements, where one possible solution is the set 74 specifying the sequence of feasible cloud elements {"AGG1", "C1", "C10", and "C13"} for the respective request nodes 54d, 54a, 54b, and 54c; another possible solution is the sets 74 specifying the sequence of feasible cloud elements {"AGG1", "C1", "C10", and "C21"} for the respective request nodes 54d, 54a, 54b, and 54c, etc. The processor circuit 46 can filter in operation 100 the sets 74 of possible solutions based on the service provider-based constraints and policies, for example bandwidth constraint policies, overlay constraint policies, etc., in order to generate or determine the candidate sets of feasible cloud elements.

Referring to FIG. 6B, the placement pivot 52 is chosen from the feasible cloud elements 68 in operation 102 by the processor circuit 46. For example, the placement pivot can have a maximum depth in the physical topology 14 relative to the set of identified feasible cloud elements; in other words, the maximum depth (relative to the provider edge 24) of all the feasible cloud element 68 is four hops. The placement pivot 52 also can be chosen alternately, or in addition to maximum depth, based on identifying the network node having the maximum available link bandwidth (e.g., uplink bandwidth) relative to the other feasible cloud elements having the same maximum depths (and/or performing the same request node service).

Figure 10:
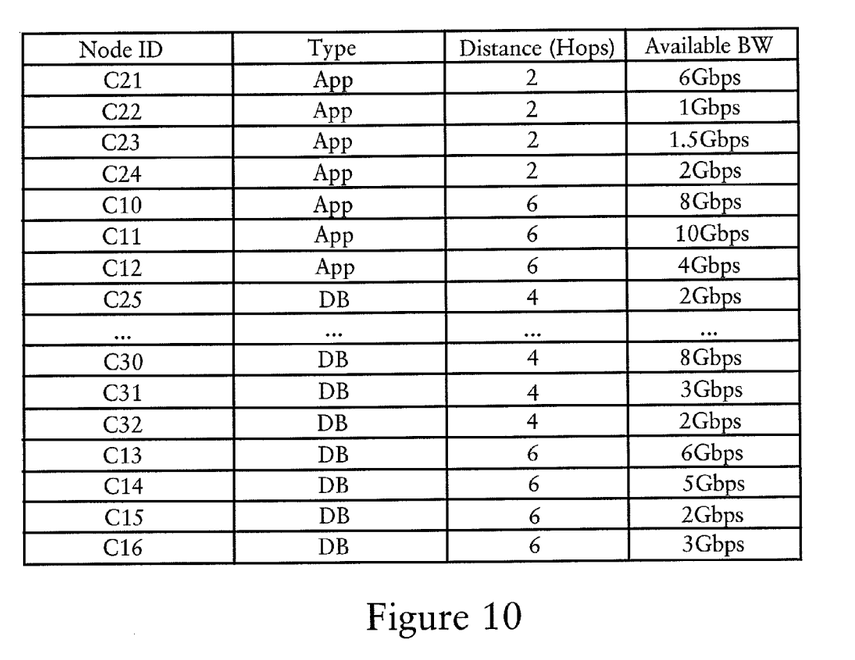
FIG. 10 illustrates an example ordering by the apparatus of FIG. 3 of feasible cloud elements according to increasing distance from the placement pivot of FIG. 4, according to an example embodiment.

The processor circuit 46 in operation 104 orders the candidate sets of feasible cloud elements as illustrated in FIG. 10, starting with the shortest distance to the placement pivot in order by increasing distance from the placement pivot 52; in other words, the processor circuit 46 orders the feasible cloud elements 68 by starting with the feasible cloud element 68 causing the minimal consumption of bandwidth by traveling the least number of hops to the placement pivot 52. Other heuristics can be used for ordering the candidate sets of feasible cloud elements relative to the placement pivot 52, for example ordering based on minimal fragmentation. Further, although only one placement pivot 52 is disclosed, additional placement pivot can be utilized for multidimensional ordering.

The ordered list of candidate sets can be pruned in operation 106 by the processor circuit 46 based on removing any candidate sets including infeasible segments. For example, if the processor circuit determines that a path from the compute node C20 or C22 to C30 is infeasible, then the processor circuit 46 can remove from consideration any candidate set that includes the path from the compute node C20 to C30, or that includes the path from the compute node C22 to C30.

The processor circuit 46 in operation 108 begins calculating the fitness function for each of the first K candidate sets in the ordered list 78 of FIG. 11, starting with the first candidate set in the ordered list, to heuristically determine the fitness function value (e.g., the relative amount of bandwidth to be consumed by the candidate set). As illustrated with respect to FIG. 11, the processor circuit 46 in operation 110 of FIG. 6B identifies the optimum candidate set 86 having the optimized fitness function, for example based on determining a minimum sum of residual bandwidth. Hence, the optimum candidate set 86 is heuristically determined to provide a sequence of physical network nodes that implement the request graph 42 in the physical topology 14 with minimal consumption of bandwidth in the physical topology.

According to the example embodiments, cloud resource placement in a physical topology of a service provider data network can be optimized based on ordering candidate sets of feasible cloud elements relative to a placement pivot identified as providing the greatest influence in affecting the fitness function describing the available resources in the physical graph. Hence, the optimized placement can be identified to maximize the fitness function over the residual physical data center's capacity, while satisfying service provider constraints and policies.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

retrieving, for a cloud computing service, a request graph specifying request nodes identifying respective requested cloud computing service operations, and at least one request edge specifying a requested path requirements connecting the request nodes;

identifying a placement pivot from among feasible cloud elements identified in a physical graph representing a data network having a physical topology, each feasible cloud element an available solution for one of the request nodes, the placement pivot having a maximum depth in the physical topology relative to the feasible cloud elements;

ordering the feasible cloud elements, within candidate sets of feasible cloud elements identified as available solutions for the at least one request edge, according to increasing distance from the placement pivot to form an ordered list of candidate sets of feasible cloud elements; and determining an optimum candidate set, from at least a portion of the ordered list, based on the optimum candidate set having an optimized fitness function in the physical graph from among the other candidate sets in the ordered list.

2. The method of claim 1, wherein the identifying further includes identifying the placement pivot as having a maximum available link bandwidth relative to other feasible cloud elements having the same maximum depth.

3. The method of claim 1, wherein the request graph includes customer request nodes specifying respective customer-requested cloud computing service operations, and at least one service provider-based request node representing a service provider policy implemented in the physical graph, and at least one request edge connecting the request nodes.

4. The method of claim 1, wherein each feasible cloud element is determined as an available solution for the corresponding one request node based on the request node specifying service requirements on at least one prescribed attribute type.

5. The method of claim 4, wherein the prescribed attribute type includes at least one of processor type, virtual data center service type, or network service type.

6. The method of claim 1, wherein the physical graph represents a service provider deployment of the data network according to service provider-based constraints and policies.

7. The method of claim 6, further comprising determining the candidate sets of feasible cloud elements for the at least one request edge based on:

identifying, among the feasible cloud elements relative to the physical graph, sets of possible solutions for feasible cloud elements based on identifying respective paths in the physical graph connecting the associated feasible cloud elements;

filtering the sets of possible solutions based on the service provider-based constraints and policies.

8. The method of claim 7, wherein:

the service provider-based constraints and policies include at least one of a bandwidth constraint limiting bandwidth consumption on at least one of the feasible cloud elements, or an overlay constraint limiting traversal of network traffic from one of the request nodes to a second of the request nodes;

the optimum candidate set heuristically determined to provide a sequence of physical network nodes implementing the request graph in the physical topology and that minimizes consumption of bandwidth in the physical topology.

9. The method of claim 1, wherein the requested cloud computing service operations include at least one of compute, storage, or networking services.

10. An apparatus comprising:

a memory circuit configured for storing a request graph for a cloud computing service, the request graph specifying request nodes identifying respective requested cloud computing service operations, and at least one request edge specifying a requested path requirements connecting the request nodes; and a processor circuit configured for:

identifying a placement pivot from among feasible cloud elements identified in a physical graph representing a data network having a physical topology, each feasible cloud element an available solution for one of the request nodes, the placement pivot having a maximum depth in the physical topology relative to the feasible cloud elements, ordering the feasible cloud elements, within candidate sets of feasible cloud elements identified as available solutions for the at least one request edge, according to increasing distance from the placement pivot to form an ordered list of candidate sets of feasible cloud elements, and determining an optimum candidate set, from at least a portion of the ordered list, based on the optimum candidate set having an optimized fitness function in the physical graph from among the other candidate sets in the ordered list.

11. The apparatus of claim 10, wherein the processor circuit is configured for identifying the placement pivot as having a maximum available link bandwidth relative to other feasible cloud elements having the same maximum depth.

12. The apparatus of claim 10, wherein the request graph includes customer request nodes specifying respective customer-requested cloud computing service operations, and at least one service provider-based request node representing a service provider policy implemented in the physical graph, and at least one request edge connecting the request nodes.

13. The apparatus of claim 10, wherein each feasible cloud element is determined as an available solution for the corresponding one request node based on the request node specifying service requirements on at least one prescribed attribute type.

14. The apparatus of claim 13, wherein the prescribed attribute type includes at least one of processor type, virtual data center service type, or network service type.

15. The apparatus of claim 10, wherein the physical graph represents a service provider deployment of the data network according to service provider-based constraints and policies.

16. The apparatus of claim 15, wherein the processor circuit is configured for determining the candidate sets of feasible cloud elements for the at least one request edge based on:

identifying, among the feasible cloud elements relative to the physical graph, candidate sets of possible solutions for feasible cloud elements based on identifying respective paths in the physical graph connecting the associated feasible cloud elements;

filtering the candidate sets of possible solutions based on the service provider-based constraints and policies.

17. The apparatus of claim 16, wherein:

the service provider-based constraints and policies include at least one of a bandwidth constraint limiting bandwidth consumption on at least one of the feasible cloud elements, or an overlay constraint limiting traversal of network traffic from one of the request nodes to a second of the request nodes;

the optimum candidate set heuristically determined to provide a sequence of physical network nodes implementing the request graph in the physical topology and that minimizes consumption of bandwidth in the physical topology.

18. The apparatus of claim 10, wherein the requested cloud computing service operations include at least one of compute, storage, or networking services.

19. Logic encoded in one or more non-transitory tangible media for execution and when executed operable for:

retrieving, for a cloud computing service, a request graph specifying request nodes identifying respective requested cloud computing service operations, and at least one request edge specifying a requested path requirements connecting the request nodes;

identifying a placement pivot from among feasible cloud elements identified in a physical graph representing a data network having a physical topology, each feasible cloud element an available solution for one of the request nodes, the placement pivot having a maximum depth in the physical topology relative to the feasible cloud elements;

ordering the feasible cloud elements, within candidate sets of feasible cloud elements identified as available solutions for the at least one request edge, according to increasing distance from the placement pivot to form an ordered list of candidate sets of feasible cloud elements; and determining an optimum candidate set, from at least a portion of the ordered list, based on the optimum candidate set having an optimized fitness function in the physical graph from among the other candidate sets in the ordered list.

20. The logic of claim 19, wherein the identifying further includes identifying the placement pivot as having a maximum available link bandwidth relative to other feasible cloud elements having the same maximum depth.

\* \* \* \* \*